(12) United States Patent
Hart

(10) Patent No.: US 6,981,439 B2
(45) Date of Patent: Jan. 3, 2006

(54) REDUNDANT FLOW CONTROL FOR HYDRAULIC ACTUATOR SYSTEMS

(75) Inventor: Kenneth E. Hart, Simi Valley, CA (US)

(73) Assignee: HR Textron, Inc., Santa Clarita, CA (US)

( * ) Notice: Subject to any disclaimer, the term of this patent is extended or adjusted under 35 U.S.C. 154(b) by 95 days.

(21) Appl. No.: 10/746,033

(22) Filed: Dec. 23, 2003

(65) Prior Publication Data

US 2005/0132877 A1 Jun. 23, 2005

Related U.S. Application Data

(60) Provisional application No. 60/497,284, filed on Aug. 22, 2003.

(51) Int. Cl.
*F15B 13/00* (2006.01)
(52) U.S. Cl. .......................................... 91/509; 60/403
(58) Field of Classification Search ................. 60/403, 60/405; 91/509, 510
See application file for complete search history.

(56) References Cited

U.S. PATENT DOCUMENTS 3,270,623 A * 9/1966 Garnjost et al. ............. 91/510
3,683,749 A   8/1972 Bayles
3,837,262 A * 9/1974 Hedermann ................. 91/509
3,933,176 A * 1/1976 Wheeler ..................... 91/510
4,472,780 A * 9/1984 Chenoweth et al. .......... 701/4
4,472,998 A   9/1984 Vanderlaan

FOREIGN PATENT DOCUMENTS

GB         1321148         6/1973

* cited by examiner

*Primary Examiner*—Edward K. Look
*Assistant Examiner*—Michael Leslie
(74) *Attorney, Agent, or Firm*—Lesley A. Hamlin

(57) ABSTRACT

Two or more flow control valves may be used to provide redundant flow control for a hydraulic actuator or servoactuator. The flow control valves include a sleeve, a bypass control spool, and a primary control spool. Under normal operating conditions, each bypass control spool is stationary relative to the sleeve and the flow control valve functions as a four-way hydraulic flow control valve. Each flow control valve is connected to a bypass-shutoff valve including a bypass spool that is moveable from a shut-off position to a bypass position. Upon supply pressure failure to one flow control valve, the bypass spool moves to the bypass position, reducing pressure in the corresponding actuator piston chambers. When a primary control spool becomes jammed, the corresponding bypass control spool moves within its sleeve allowing a bypass groove to port control pressure to the return line, thereby reducing pressure in the corresponding actuator piston chambers.

38 Claims, 9 Drawing Sheets

REDUNDANT FLOW CONTROL FOR HYDRAULIC ACTUATOR SYSTEMS

This application claims the benefit of U.S. Provisional Application No. 60/497,284, filed Aug. 22, 2003, the contents of which are incorporated herein by reference.

BACKGROUND

Hydraulic actuators utilize a fluid for the movement of an output element, and these types of actuators are used in a variety of applications including numerous mechanical and aeronautical applications. Hydraulic actuators may be used with hydraulic flow control valves in servomechanisms to control machines and structures, and are sometimes referred to as servoactuators. Servoactuators are commonly used on rotary and fixed-wing aircraft to counter and control the large forces that develop on the flight control surfaces experience during operation of the aircraft. For example, servoactuators may be used in rotary aircraft to position equipment such as a swashplate. Servoactuators may also be used in fixed wing aircraft to position equipment such as nose wheel landing gear, main landing gear, speed brake control surfaces, flap control surfaces and primary flight control surfaces.

For some applications, such as those above and others, it may be desirable to use tandem hydraulic pistons, i.e., pistons that have two or more heads. For tandem pistons, redundant flow control valves and hydraulic systems may be used so that the hydraulic system, e.g., a flight control system, is able to function when one of the hydraulic systems fails. When two piston heads are present, the actuator may be referred to as a tandem or dual-tandem actuator or servoactuator.

In typical redundant dual-tandem servoactuators, two mechanical flow control valves are required to provide necessary flow control redundancy. Redundancy may include the ability to provide flow control to an actuator in the event of a hydraulic supply failure or a control valve jam, i.e., a situation where the control valve spool jams or seizes within the sleeve of the control valve. For example, in aircraft applications, it is desirable for a redundant dual-tandem servoactuator to have a fail-operate capability that allows the pilot to mechanically operate the servoactuator with one hydraulic system following a single hydraulic supply failure in the other hydraulic system. It is also desirable for a redundant dual-tandem servoactuator to have a fail-operate capability which allows the pilot to mechanically operate both flow control valves following a jam or seizure in one of the flow control valves.

A variety of redundant servoactuators have been used for such safety purposes, however these have often utilized the relatively high system pressures of the hydraulic supply. Such pressures are typically measured in thousands of pounds per square inch (ksi). Such high pressures can create large bias forces in the chambers of a non-operational piston/cylinder assembly after a single hydraulic system failure, which in turn can make movement of a failed system difficult for an operator and thus may negate advantages of having a redundant actuator system.

For the foregoing reasons, there is a need for redundant flow control for hydraulic actuators that provides fail-operate capability with subsequent low pressure and low bias forces in a failed actuator system.

SUMMARY OF THE INVENTION

The present invention is directed to a redundant flow control valve system for redundant hydraulic actuator systems, including but not limited to, dual-hydraulic actuator systems.

A first embodiment of the present invention may include a hydraulic flow control system for use with a tandem hydraulic actuator. The flow control system may include a flow control valve assembly including a sleeve, a bypass control spool slidingly disposed within the sleeve, and a primary control spool slidingly disposed within the bypass control spool. A bypass-shutoff valve may be hydraulically coupled to a supply line, a return line, a control line, an actuator extend line and an actuator retract line that control one piston of the actuator. The flow control system may also include a restrictor-check valve assembly including a directional check valve and a restrictor means. The bypass control spool may include one or more grooves and may have a control groove having two control edges.

A second embodiment may include a servoactuator control system. The system may include a first flow control valve having a first primary control spool slidingly disposed within a first bypass spool and a first fixed sleeve in which the first bypass spool is slidingly disposed. The system may include a second flow control valve having a second primary control spool slidingly disposed within a second bypass spool and a second fixed sleeve in which the second bypass spool is slidingly disposed. A first bypass-shutoff valve may be hydraulically coupled to the first control valve. A second bypass-shutoff valve may be hydraulically coupled to the second control valve. A first restrictor-check valve assembly may be hydraulically coupled to the first bypass shut-off valve. A second restrictor-check assembly may be hydraulically coupled to the second bypass-shutoff valve. A tandem hydraulic actuator may be hydraulically coupled to the first control valve and the second control valve. The first and second bypass control spools may each include an outer radial surface having one or more circumferential grooves, including a control groove with first and second control edges.

A third embodiment may include a method of providing redundant flow control for a hydraulic actuator. Cylinder chamber pressures in both sides of a corresponding actuator may be ported to a corresponding return line in response to failure of a hydraulic flow control system. Flow control may be provided to a corresponding piston of a non-failed hydraulic flow control system. The cylinder chamber pressures in both sides of the corresponding actuator may be ported to the corresponding return line in response to a hydraulic supply line failure and/or an actuator jam. The cylinder chamber pressures may be ported to the return line by moving a bypass-shutoff valve from a shut-off position to a bypass position. The cylinder chamber pressures may be ported to the return line by displacing a bypass control spool from a null position. The displacing of the control spool may include porting a control line to the corresponding return line.

BRIEF DESCRIPTION OF THE DRAWINGS

These and other features, aspects, and advantages of the present invention will become better understood with regard to the following description, appended claims, and accompanying drawings. The drawings include the following:

DETAILED DESCRIPTION

The present invention may be understood by the following detailed description, which should be read in conjunction with the attached drawings. The following detailed description of certain embodiments is by way of example only and is not meant to limit the scope of the present invention.

Figure 1:
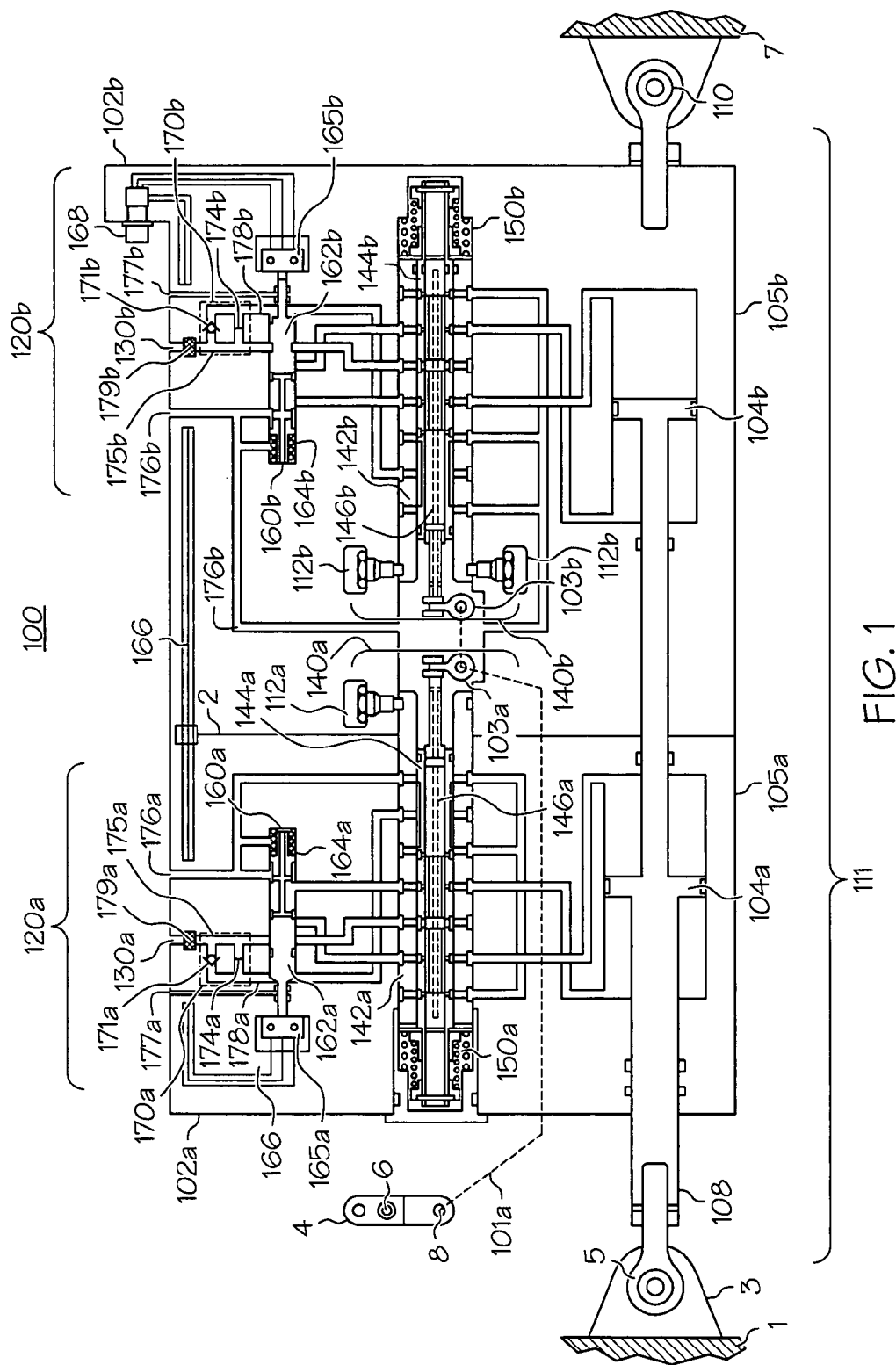
FIG. 1 shows a main servo-control system applied to a helicopter flight control system.

With reference to FIG. 1, a servoactuator control system or main servo-control system 100 is shown for controlling a dual-tandem hydraulic actuator 111 with a pair of redundant hydraulic flow control systems 120a, 120b. In the drawings, reference characters ending with "a" and "b", indicate corresponding elements of respective first and second hydraulic flow control systems, e.g., 120a and 120b, except where noted.

Each hydraulic flow control system 120a, 120b may include a hydraulic flow control valve 140a, 140b, a bypass-shutoff valve assembly 160a, 160b, and a restrictor-check valve assembly 170a, 170b. Each flow control system 120a, 120b may act to control the position of a piston 104a, 104b in a cylinder 105a, 105b of the dual-tandem hydraulic actuator 111. The pistons 104a, 104b may be connected as part of an output piston assembly having an output rod 108.

In certain embodiments, the hydraulic flow control systems 120a, 120b may each be included in a separate manifold 102a, 102b to reduce or eliminate the possibility that cracks affecting one system could propagate to the other system. The first and second manifolds 102a, 102b may be rigidly attached together and first and second cylinders 105a, 105b may be rigidly attached together. For example, cylinders 105a, 105b may be attached using high-strength bolts spaced around center gland areas of the cylinders 105a, 105b. Alternatively, the hydraulic flow control systems 120a, 120b may be included in a single manifold.

With continued reference to FIG. 1, the output rod 108 may be connected at a connection point 3 to a structure 1, e.g., a helicopter structure or frame. The flow control systems 120a, 120b may control the hydraulic actuator 111 to extend and retract the output rod 108 relative to the pistons 104a, 104b. The movement of the output rod 108 produces relative motion between the rod 108 and the manifolds 102a, 102b as well as any elements that are attached to the manifolds 102a, 102b. An example of such an attached structure is a helicopter swashplate 7 (of which only a portion is shown). A swashplate 7 may be connected to a manifold 102b by a suitable connection, e.g., a rod and ball end 110. For such applications, the servoactuator control system 100 may operate to provide output position, rate, and load control to the swashplate 7. In this manner, a moving-body type of servoactuator control system may be achieved.

Each of the hydraulic flow control valves 140a, 140b in flow control systems 120a, 120b may include an outer sleeve 142a, 142b, a bypass control spool 144a, 144b and a primary control spool 146a, 146b. Each bypass control spool 144a, 144b, fits in and may move within the associated sleeve 142a, 142b. The flow control valves 140a, 140b may be connected by connection means or linkage, such as an input shaft (indicated by dashed lines 101a) connected to the primary control spools 146a and 146b. As a result, the primary control spools 146a, 146b may move in tandem in response to the same mechanical input.

The primary control spool 146a, 146b is moveable within the bypass control spool 144a, 144b along a longitudinal axis. The sleeve 142a, 142b, the bypass control spool 144a, 144b, and the primary control spool 146a, 146b may be arranged in a concentric, nested configuration. The primary control spool 146a, 146b may be lapped to the bypass control spool 144a, 144b. The primary control spool 146a, 146b and bypass control spool 144a, 144b and associated grooves and orifices may be subject to flow grinding, after which process these components may be characterized as having been "flow-ground". The bypass control spool 144a, 144b may be similarly lapped and flow-ground to the sleeve 142a, 142b. The outer sleeve 142a, 142b of each flow control system may be held in place by appropriate flow control valve hydraulic null adjuster/lock means 112a, 112b, e.g., one or more screw assemblies. While only one adjuster/lock means 112a is shown for flow control valve 140a, a second adjuster/lock means 112a may also be present, similar to the two adjuster/lock means 112b shown for flow control valve 140b.

Figure 4:
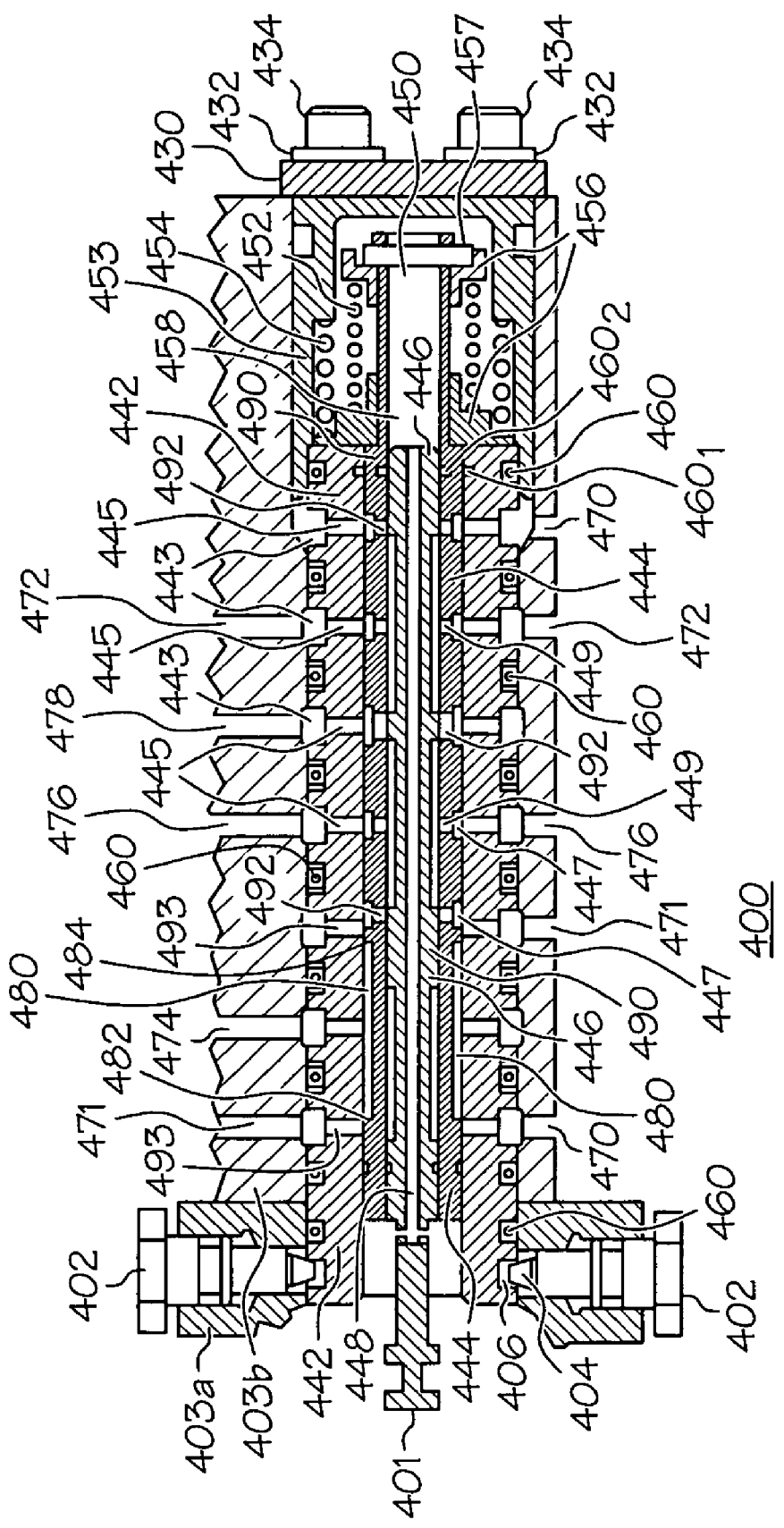
FIG. 4 shows an enlarged view of a representative flow control valve of a main servo-control system.

Centering means 150a, 150b may act to bias the respective bypass control spools 144a, 144b to a predetermined position within each related manifold. In certain embodiments, for example as shown in FIG. 4, spring assemblies including, but not limited to, individual inner and outer, nested coil springs and retainers may be used as suitable centering means.

A bypass-shutoff valve 160a, 160b may be hydraulically connected to the flow control valve 140a, 140b. The bypass-shutoff valve 160a, 160b may be a shuttle valve and may have a bypass spool 162a, 162b that is biased by a bias means 164a, 164b such as, for example, a bias spring. For each flow control system 120a, 120b, the respective bypass-shutoff valve 160a, 160b may function to (i) allow an uninterrupted supply of hydraulic fluid from a supply line 130a, 130b to the flow control valve during normal operation, and (ii) divert control pressures in the extend and retract lines to the return line(s) in the event of a supply failure or a control valve jam.

Figure 2:
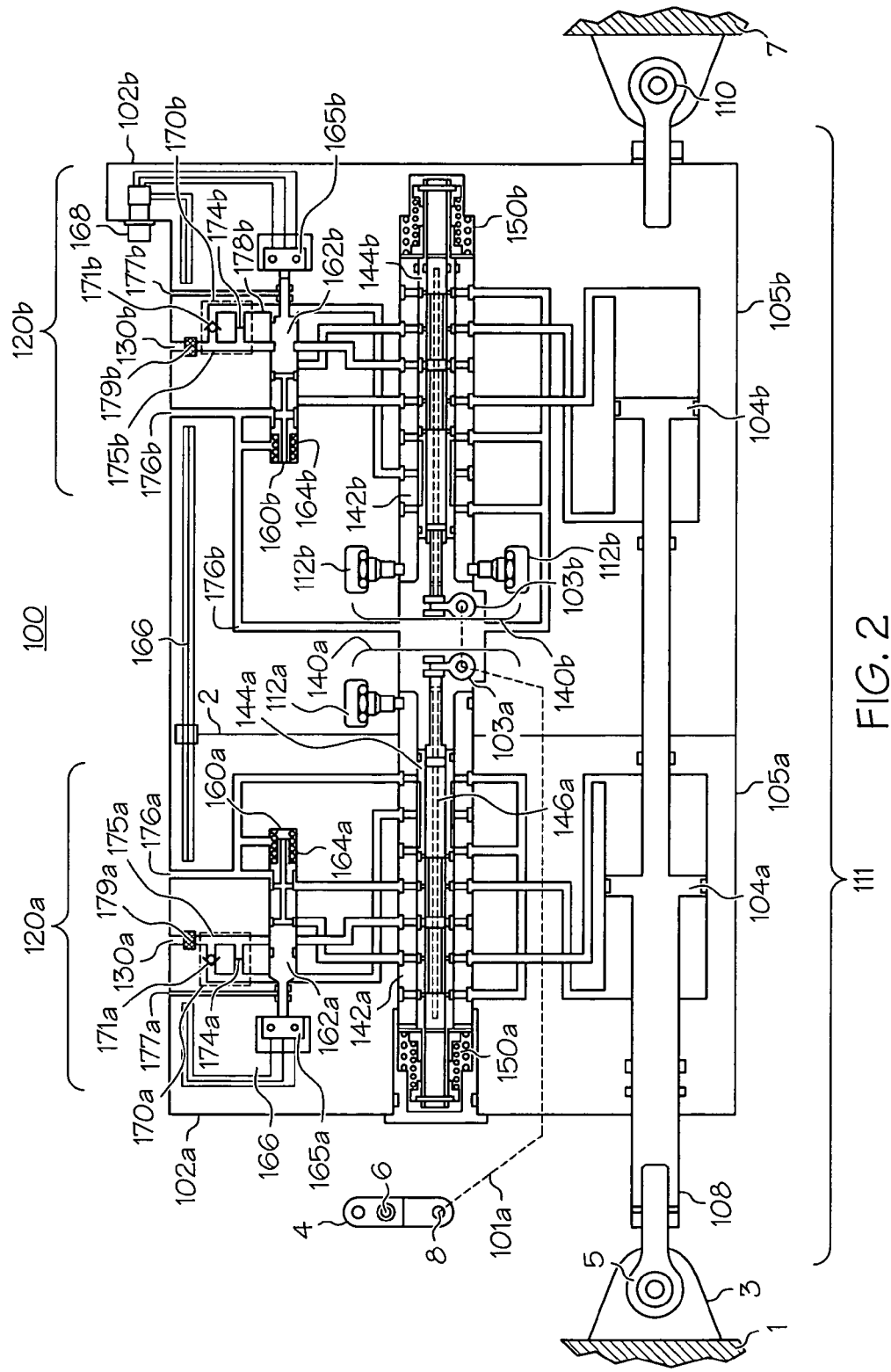
FIG. 2 shows the system of FIG. 1 with system pressure failure in one flow control system.

Depending on operating conditions in the particular hydraulic flow control system, e.g., 120a, the bypass spool 162a, 162b is movable from a first position, as shown in FIG. 1, to a second position, as shown in FIG. 2. Switch 165a, 165b may in certain embodiments be a microswitch and may indicate when the bypass spool 162a, 162b is in the bypass position.

A switch 165a, 165b may be present for each bypass-shutoff valve 160a, 160b to indicate the position of the bypass spool, e.g., 162a. The switches 165a, 165b may be connected by one or more electrical leads 166 and may be accessed by an electrical connector 168.

A restrictor-check valve assembly 170a, 170b may be hydraulically connected to bypass-shutoff valve 160a, 160b. The restrictor-check valve assembly 170a, 170b may include a directional check valve 171a, 171b and a restrictor means 174a, 174b, which may be, for example, an orifice or aperture of sufficiently small size. The directional check valve 171a, 171b may permit hydraulic fluid that is displaced by the bypass spool 162a, 162b to move into the associated supply line 130a, 130b. The restrictor means may allow for fluid at a control pressure to be used to move the bypass spool 162a, 162b in certain conditions while limiting volumetric flow rates, as will be described in further detail below.

Referring now to FIG. 2, system 100 of FIG. 1 is shown with hydraulic flow control system 120a in a supply-pressure failure condition. For the condition shown, the hydraulic supply pressure at supply inlet 130a is reduced from normal supply pressure, e.g., as would occur when a leak developed in the hydraulic supply line 130a.

The bypass spool 162b for hydraulic flow control system 120b is shown in a first or "shutoff" position, for normal operation conditions of the hydraulic flow control system 120b and bypass spool 162a of hydraulic flow control system 120a is shown in a second or "bypass" position. In the shutoff position, the force from the hydraulic fluid at supply pressure on one end of the bypass spool 162b is greater than the countering force of the bias means 164b, e.g., a spring. As a result, the bypass spool 162b is held in the shutoff position and blocks certain ports in the related hydraulic circuit lines or passageways, as will be described in greater detail with respect to FIG. 5. For the shutoff position, a groove in the bypass spool is aligned with the supply line, allowing hydraulic fluid under full supply pressure to flow to the control valve 140b.

In the event of a supply pressure failure, e.g., as indicated in hydraulic flow control system 120a in FIG. 2, the bias means 164a, 164b pushes the bypass spool 162a, 162b to the bypass position. In the bypass position, pressure from the extend and retract chambers of cylinder 105a, 105b are ported to a corresponding return line 176a, 176b and the pressure acting on the piston 104a, 104b is greatly reduced, as will be explained in further detail below.

Figure 3:
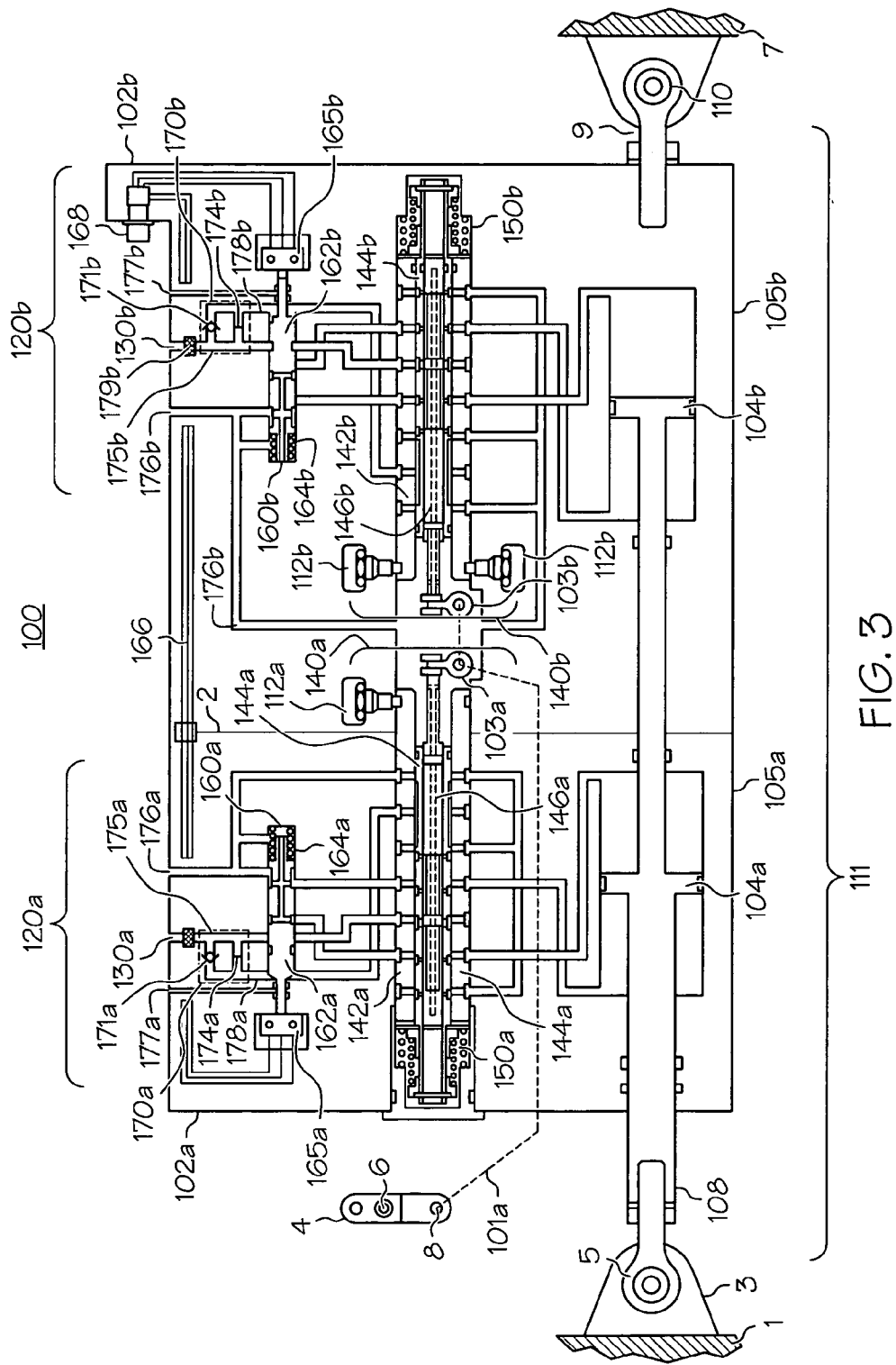
FIG. 3 shows the system of FIG. 1 in a jam condition in one flow control valve.

FIG. 3 shows system 100 of FIG. 1 in an operational condition in which hydraulic flow control system 120b is operating normally but a malfunction or jammed condition exists in hydraulic flow control system 120a. Primary control spool 146a of flow control valve 140a is shown jammed and seized with respect to bypass control spool 144a. The bypass control spool 144a is shown displaced with respect to a mechanical neutral position (i.e., its position depicted in FIGS. 1–2) by the movement of the pilot mechanical input lever 4 and input shaft 101a. The other flow control system 140b is unaffected by the jammed primary control spool 146a of flow control system 140a.

FIG. 4 shows an enlarged view of a representative flow control valve 400 for redundant flow control according to one embodiment. The flow control valve 400 may be present in a manifold 403b and may include a primary control spool 446 within a bypass control spool 444. The bypass control spool 444 may be received within a sleeve 442. An input lever attachment or end 401 may serve to transmit control forces to the primary control spool 446. The sleeve 442 may be held in the manifold 403b by one or more sleeve adjuster/locks, e.g., 402, which are operable to set and adjust the hydraulic null of the flow control valve 400. The sleeve adjuster/locks 402 may pass through portions of a second manifold 403a that is associated with another flow control valve (not shown) of a dual control valve system (e.g., system 100 of FIG. 1) and may have conical tips 404 that can be received in apertures 406 in the sleeve 442.

The primary control spool 446 may have a desired number of lands 490, e.g., four as shown, and may be lapped and flow-ground to the bypass control spool 444. Mechanical input to the primary control spool 446 may be by any known means and may include a spherical ball lever mated to a groove, for example at input end 401, on the primary control spool 446. The position of the primary control spool 446 may be controlled by mechanical input commands to the input end 401, for example by pilot input commands to an input shaft, e.g., input shaft 101a of FIG. 1.

The diametrical clearance between the sleeve 442 and bypass control spool 444 and respectively between the bypass control spool 444 and primary control spool 446 may be of any suitable size or dimension. In certain embodiments, the diametrical clearances may be on the order of 0.001 inches (0.0254 mm). A removable cover 430 may be included to allow access to the flow control valve 400 and may be attached to the manifold 403b by bolts 434 and washers 432 as shown.

The sleeve 442 may include grooves 443 and flow passages 445 and orifices 493. The grooves 443 may allow circumferential flow of hydraulic fluid around the sleeve 442. The flow passages 445 and orifices 493 may allow radial flow of hydraulic fluid through the sleeve 442. A supply line 478 may be connected to a groove 443 and a flow passage 445 in the sleeve as shown. Extend 476 and retract 472 control lines may be connected to grooves 443 and flow passages 445 in the sleeve 442. As shown in FIG. 4, upper and lower portions of the extend 476 and retract 472 lines can lead to a bypass-shutoff valve, e.g., 160b in FIG. 1 and a related cylinder, e.g., 105b in FIG. 1, respectively. Alternatively, the extend and retract lines may be connected to the bypass shutoff valve and cylinder in the reverse configuration.

The bypass control spool 444 may also include grooves 447 and flow passages 449 that allow similar flow of hydraulic fluid. The bypass control spool 444 may also include orifices 492 to control fluid flow. Certain of the respective grooves and flow passages of the bypass control spool and the sleeve may be radially aligned, although the radial position orientation is not necessary. The bypass control spool 444, the sleeve 442, and the primary control spool 446 operate as a four-way control valve under normal operation. Each groove may have one or more orifices or flow passages that connect the outer radial surface of the sleeve to the inner radial surface of the sleeve. When the bypass control spool 444 does not block the orifices 492, hydraulic fluid can flow from the hydraulic lines exterior to the sleeve 442 to the interior of the sleeve, where the bypass control spool 444 and primary control spool 446 are located. It will be understood that while seven grooves are shown on the sleeve 442, other numbers of grooves 443 may be used.

The bypass control spool 444 may be lapped and flow-ground to the sleeve 442. The bypass control spool 444 may include a control groove 480 having two flow-ground return control edges 482, 484, which in normal operational conditions overlap flow metering slots or flow passages 445 on the sleeve 442. A control line 474 having hydraulic fluid at system pressure, e.g., from restrictor means 174b in FIG. 1, may be hydraulically coupled to groove 480 between the two orifices 493 that correspond to the metering surfaces or control edges 482, 484. In a null position for normal operation, the overlap of the control edges 482, 484 may minimize any flow or pressure leakage between a control line 474 and return line(s) 470, 471. When the control edges 482, 484 move relative to the sleeve 442 and the orifices 493, the pressure in control line 474 is ported to the return lines connected at 470 and 471.

The bypass control spool 444 may function to provide (i) a flow source to the primary control spool 446 for normal flow control valve operation, and (ii) bypass flow control of the bypass-shutoff valve following a seizure or jam between the bypass control spool 444 and the primary control spool 446, such as shown for hydraulic flow control system 120a in FIG. 3. The sleeve 442 provides porting in and out of the flow control valve assembly 400 for the hydraulic supply line, return line, cylinder chamber control lines, i.e., extend and retract line, and for the bypass-shutoff valve control pressure. In the event of a jam between the bypass control spool 444 and the primary control spool 446, the bypass control spool 444 will slide with respect to the sleeve 442 and bypass groove 480 and metering surfaces, e.g., 482, 484, will port the control chamber, e.g., 511 of FIG. 5, pressure to the return line pressure, e.g., at 470 and 471.

Centering means 450 may serve to bias the position of the bypass control spool 444 at a predetermined position relative to the sleeve 442. In certain embodiments, centering means 450 may include a centering spring assembly including an isolation cover 453 having a pair of nested, inner and outer compression springs 452 and 454, a pair of spring retainers 456 and a retaining pin 457. The outer spring 454 may be preloaded between the manifold/cylinder assembly surface on one side and a spring retainer sleeve surface on the other. The inner spring 452 may be preloaded on the same retainer/sleeve surface and the retainer may be pinned to the bypass control spool 444.

In the event the primary control spool 446 becomes seized or jammed relative to the bypass control spool 444, both may move together in response to a mechanical input, thereby compressing either the inner spring 452 or outer spring 454 of the centering means 450. The primary control spool 446 may include a hollow passage 448, which may allow an end chamber 458 to be balanced to a pressure, e.g., a return pressure, of the redundant flow control valve (not shown). Passageway 448 can thus facilitate return pressure balancing of a redundant flow control valve system including flow control valve 400.

One or more adjuster/locks 402 may be used to provide null adjustment of the primary control spool 446 of the flow control valve 400 by adjusting the corresponding sleeve/bypass control spool assembly in each direction until hydraulic null is achieved. For this adjustment, the input lever may be held at mechanical null by the use of a rigid pin tool that mates with a valve stroke pin on the input lever. When hydraulic null is achieved, both adjusters for a sleeve are tightened to a controlled or predetermined torque level simultaneously, and lockwired to the manifold and/or cylinder assembly to securely hold the sleeve in position against the manifold/cylinder assembly. A controlled torque may prevent the inside diameter of the sleeve lap fit from distorting and possibly reducing the spool-to-sleeve lap clearance. The other flow control system, e.g., 140a in FIG. 1, may be adjusted to hydraulic null by null adjuster/locks, which may be located in the other flow control system (not shown). Other adjuster/locks may be used to accomplish the null adjustment and locking functions.

Because of the complimentary opposing longitudinal forces provided by the corresponding means for centering provided with the remaining flow control valve (not shown) of the redundant flow control system, the bypass control spool 444 is centered and held to the sleeve 442 in the predetermined position under a bi-directional preloaded condition. The centering spring assembly may be preloaded equally in each direction and may be designed such that there is zero clearance between the bypass control spool and the sleeve in the displacement direction (on the spool centerline).

In certain embodiments, e.g., those where intersystem leakage between different hydraulic systems is not desirable, dynamic seals 460, 4601, 4602 may be present as shown. Seals 460 may act to reduce leakage between sleeve 442 and manifold 403b. Seals $460_1$, $460_2$ may be positioned to prevent leakage between the sleeve 442 and bypass control spool 444 and also between the bypass control spool 444 and the primary control spool 446. Such seals may prevent or minimize hydraulic system leakage into end chamber 458. Such seals may be optional and if present are not required on an associated flow control valve.

Figure 5:
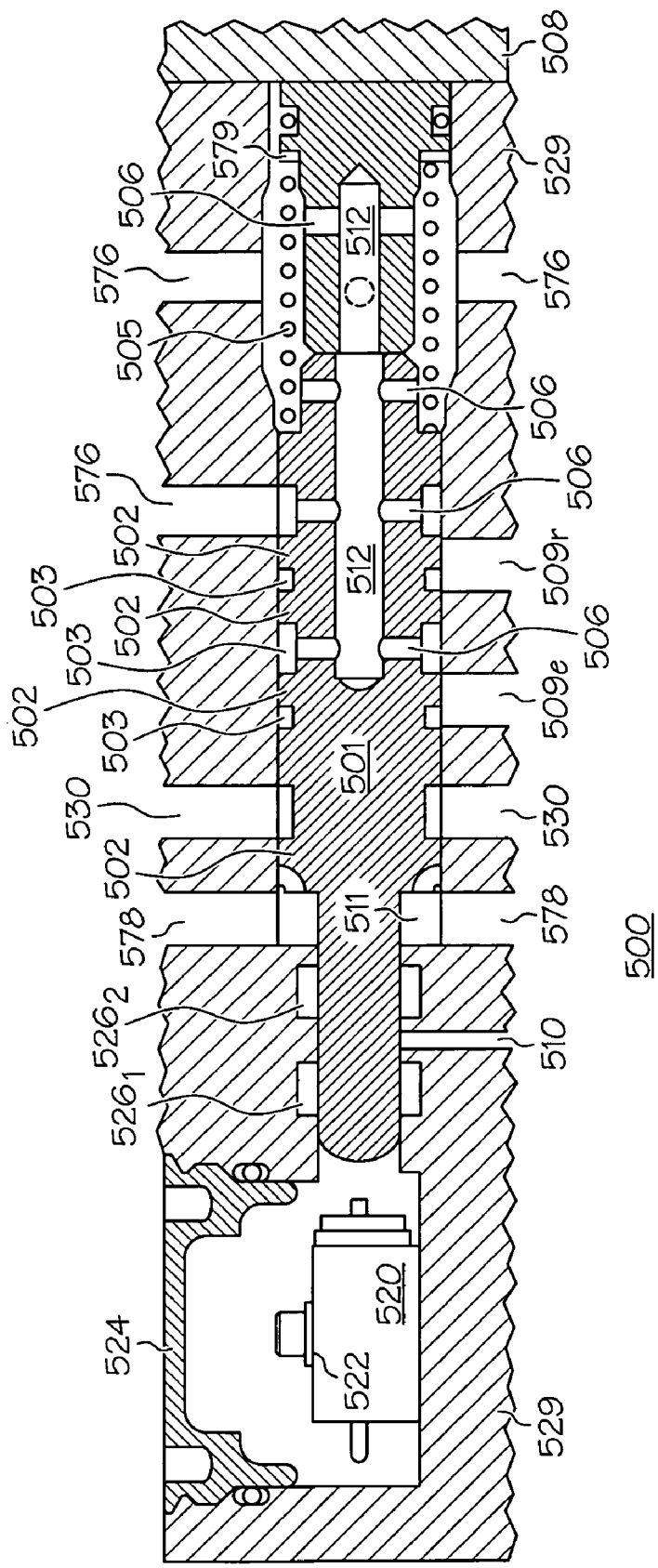
FIG. 5 shows an enlarged view of a bypass shutoff valve.

Referring now to FIG. 5, an enlarged view of a bypass-shutoff valve 500 is shown. The bypass-shutoff valve 500 may include a bypass spool 501 that is biased to a predetermined position by a bias means 505. Examples of the bias means 505 may include, but are not limited to, a spring assembly, e.g., one or more springs with a seat 579 and stop 504.

The bypass-shutoff valve 500 may be present in a manifold, e.g., 529, and may divert or port control or bypassed cylinder chamber lines, e.g., extend line 509e and retract line 509r, for an associated piston and cylinder (not shown) to a return line 576. The bypass spool 501 may be movable from a first or "shutoff" position, in which bypassed cylinder chamber lines 509e and 509r are blocked and a supply line 530 is open to a related flow control valve, e.g., 400 in FIG. 4, thereby providing normal flow control valve flow control, to a second or "bypass" position which connects cylinder chamber lines 509e and 509r to the return line 576.

Under certain operational conditions, the bypass spool 501 can become repositioned from the shutoff position to the bypass position. Such repositioning of the bypass spool 501 can occur when (i) system pressure in a control line 578 is lost or is reduced below a threshold value, or (ii) a bypass control spool moves relative to a surrounding sleeve as a result of a jam failure. In either situation (i) or (ii), pressure in a control chamber 511 on one side the bypass spool 501 is reduced below a predetermined threshold, in which case the force supplied by bias means 505 forces the bypass spool 501 to become repositioned from the shutoff position (shown) to the bypass position, i.e., to the left end of control chamber 511 in FIG. 5.

The bypass spool 501 may have one or more lands 502 and circumferential grooves 503. The bypass spool 501 may also have a passageway or internal flow path(s) that includes a central port 512 and flow passages 506. Flow passages 506 may connect the central port 512 to the channels or grooves 503 between certain of the lands 502. The flow passages 506 and central port 512 may be drilled or formed by other methods including, but not limited to, electrical discharge machining (EDM).

In certain embodiments, a microswitch 520 may be present to detect the position of the bypass spool 501, so that a system pressure or flow control valve seizure failure can be indicated to an observer or operator. A removable microswitch cover 524 may allow access to the microswitch 520. Dynamic seals $526_1$, and $526_2$ may be present for improved hydraulic sealing. A vent 510 may be present to relieve pressure between dynamic seals $526_1$, and $526_2$. One or more screws 522 may be present to secure the microswitch 520. A retainer 508 may be present to restrain motion of the bypass spool 501 and to allow for access to and positioning of the spring stop 504.

Figure 6:
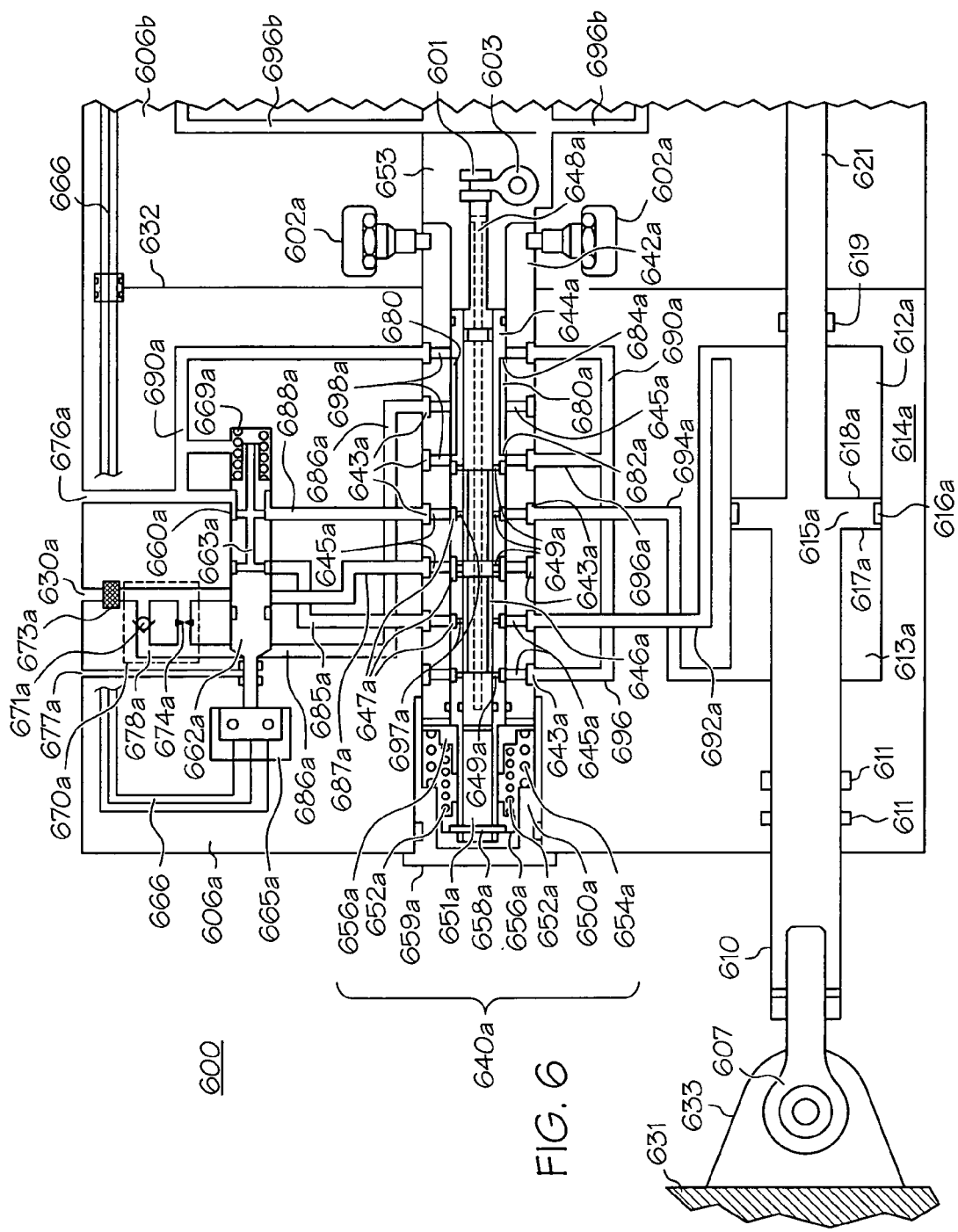
FIG. 6 shows an enlarged view of one flow control system with system pressure failure.

FIG. 6 shows a portion of a main servo-control actuator system 600 including two flow control systems, one of which, flow control system 620a, is shown. Flow control system 620a may include a flow control valve 640a, and also a bypass-shutoff valve 660a. A corresponding cylinder 614a, piston 615a, output rod 610 with dynamic seals 611, 619, and main shaft 621 of an associated dual piston tandem actuator is also shown. The output rod 610 may be connected to a structure 631 such as a flight control element or airframe by a rod and ball end 607 and bracket 633. While not shown in the drawing, it should be understood that a second flow control system may be used in conjunction with the features shown to act on the second piston of the dual piston tandem actuator and to provide redundant flow control functionality.

The flow control valve 640a may include a primary control spool 646a within a bypass control spool 644a. The bypass control spool 644a may be received within a sleeve 642a. The sleeve 642a may include grooves 643a, flow passages 645a and orifices 698a. The bypass control spool 644a may include grooves and 647a, orifices 649a, and flow passages 697a as described above so that the flow control valve 640a acts as a four-way control valve under normal operation. The bypass control spool 644a may also include a bypass groove 680a with metering surfaces or control edges 682a and 684a. One or more grooves 643a in the sleeve 642a may be connected by bypass return lines 696a to the return circuit or line 690a. Control lines 692a, 694a to extend and retract the piston 615a may connect the piston 615a to the flow control valve 640a and sleeve 642a as shown. Control lines 692a and 694a may act on different sides, e.g., extend and retract surfaces or sides 618a and 617a, of the piston 615a. A dynamic seal 616a may be present to reduce or eliminate leakage and separate cylinder chamber pressures 612a and 613a.

An input lever or end 601a with input attachment 603a may serve to transmit control forces to the primary control spool 646a. The input lever attachment or end 601a and input lever 603a may be linked to a corresponding input assembly of the associated flow control system so that both primary control valves move in tandem. The flow control valve 640a may be present in a manifold 606a, which may be connected to a second manifold 606b that contains a second flow control system (not shown). The two manifolds 606a, 606b may be connected as connection points, e.g., bolted connection, and abut one another as indicated by division line 632. The sleeve 642a may be held in the manifold 606a by one or more sleeve adjuster/locks 602a.

Centering means 650a including a spring assembly with inner 652a and outer springs 654a, retainers 656a, and a pin 658a may position and preload the bypass control spool 644a with respect to the sleeve 642a. A cover 659a may allow access to the centering means and/or control valve 640a.

The operational condition shown in FIG. 6 corresponds to system pressure or hydraulic fluid loss failure in a supply line 630a to the first hydraulic flow control system 620a. When the pressure in the supply line 630a drops below a predetermined threshold, for example in the case of a hydraulic fluid leak, the pressure in control line 686a also drops and a bias force supplied by a spring 669a repositions a shuttle valve or bypass spool 662a from a shutoff position to a bypass position inside the bypass-shutoff valve assembly 660a. Hydraulic fluid volume from a bypass-shutoff valve control pressure chamber connected to a control line upper portion 678a and lower portion 686a may be displaced through one-way check valve 671a to facilitate the repositioning of the bypass spool 662a. The check valve 671a, with blocked flow direction as shown by an arrow, may be part of a restrictor-check valve assembly 670a that also includes restrictor means 674a such as an orifice. A filter 673a may be present in the supply line 630a to remove hydraulic fluid contaminants.

When the bypass spool 662a is in the bypass position as shown, cylinder chamber pressure in both extend and retract sides 612a and 613a is ported through the bypass lines 685a and 688a, through flow passage 663a in the bypass spool, to a return line or circuit 676a. In the bypass position, the bypass spool 662a blocks an upper portion of the supply line 630a from a lower portion 687a of the supply line that supplies the flow control valve 640a.

The bypass position of the bypass spool 662a may be detected by a switch 665a, which may be connected by lines or wires 666 to a desired location, e.g., a corresponding switch for the second flow control system and/or an input/output connection, e.g., electrical connector 168 in FIG. 1.

In the configuration shown in FIG. 6, cylinder chamber pressures on either side 612a, 613a of piston 615a in cylinder 614a will be equal or substantially equal to the pressure in the return line 676a. Since return line pressures are typically much lower than the supply or system line pressures, the normally operating hydraulic flow control system (not shown) that operates on the second piston connected to shaft 621 of the dual-tandem piston may operate without having to overcome large forces on piston 615a that would otherwise be present.

In certain embodiments, the return line pressure of one flow control system, e.g., the related system that is not shown, may be ported to the end chamber 651a of the flow control valve 640a to maintain return line pressure balancing on both flow control valve assemblies of the main servo-control actuator system 600. For example, return line pressure at 653 from a return line 696b of the related flow control valve assembly may be ported through ports, e.g., 648a, in the primary control spool 646a to end chamber 651a.

Figure 7:
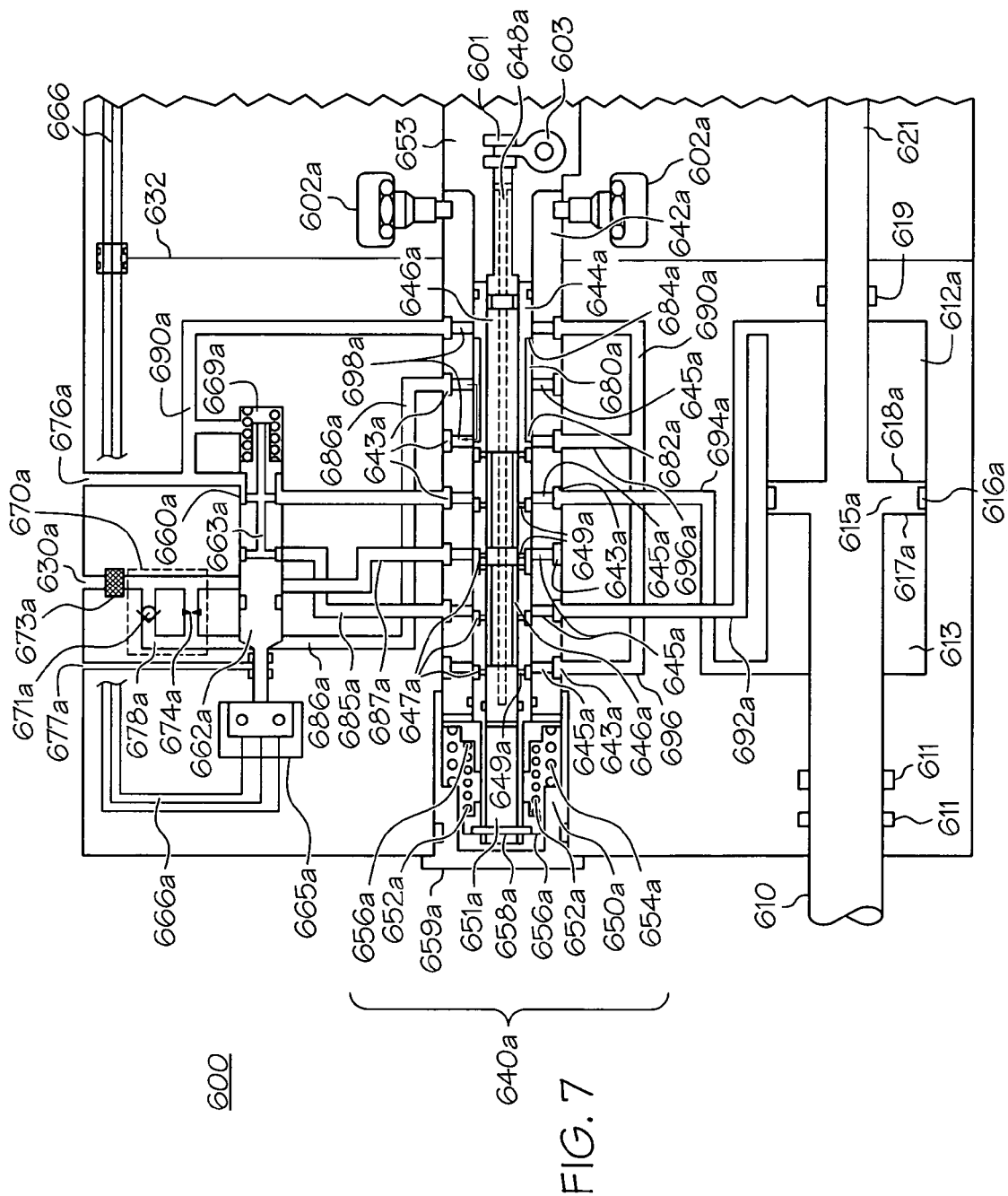
FIG. 7 shows the system of FIG. 6 in a jammed flow control valve condition.

FIG. 7 shows the portion of a main servo-control actuator system 600 of FIG. 6 with flow control valve 640a in a seized or jam condition. The primary control spool 646a is shown jammed and seized with respect to the related bypass control spool 644a with the bypass control spool 644a being displaced from a neutral position with respect to the sleeve 642a. The neutral position for the bypass control spool 644a may be adjusted to a desired position, for example, the position shown in FIGS. 1 and 2.

As shown in FIG. 7, when the bypass control spool 644a is displaced from the neutral position, one of the metering surfaces, e.g., 682a or 684a, travels past an edge or portion of an associated orifice 698a in the sleeve 642a, allowing hydraulic fluid at control pressure in control line 686a from the control side of the bypass-shutoff valve to be diverted or ported to the return line 676a by way of line 690a. Once the hydraulic fluid in control line 686a is diverted to the return line, the pressure on the control side of the bypass spool 662a drops and the bypass spool 662a is repositioned by the bias means 669a from the shutoff position to the bypass position (as shown). Once in the bypass position, the bypass spool 662a blocks the flow of hydraulic fluid from the supply line 630a to the flow control valve 640a through line 687a.

In this configuration, hydraulic fluid in the control line 686a may flow (as shown by arrow) through bypass groove 680, into flow passage 645a, and into corresponding sleeve groove 643a. Once in groove 643a, which may be circumferential, the fluid may enter the return line system, e.g., lines 696a and 690a and groove 643a. The upper portion of line 690a may connect the sleeve 642a to the bypass-shutoff valve 660a and return line 676a as shown. For the position shown, a restrictor or orifice 674a of the restrictor-check valve assembly 670a may prevent a high volume of hydraulic fluid at supply pressure 630a from building up pressure at 686a due to its connection with return line 676a. This may prevent repositioning of the bypass spool 662a to the shutoff position.

For the configuration shown in FIG. 7, cylinder chamber pressure in both extend and retract sides 612a and 613a of piston 615a is reduced to the level of the return line pressure. The normally operating flow control system (not shown) may continue to control the other piston of the dual piston actuator connected to shaft 621 without having to counter high-pressure forces acting on piston 615a. The return line pressure of one flow control system (not shown) may be ported through port 648a to end chamber 651a to maintain return line pressure balancing on both flow control valve assemblies.

Figure 8:
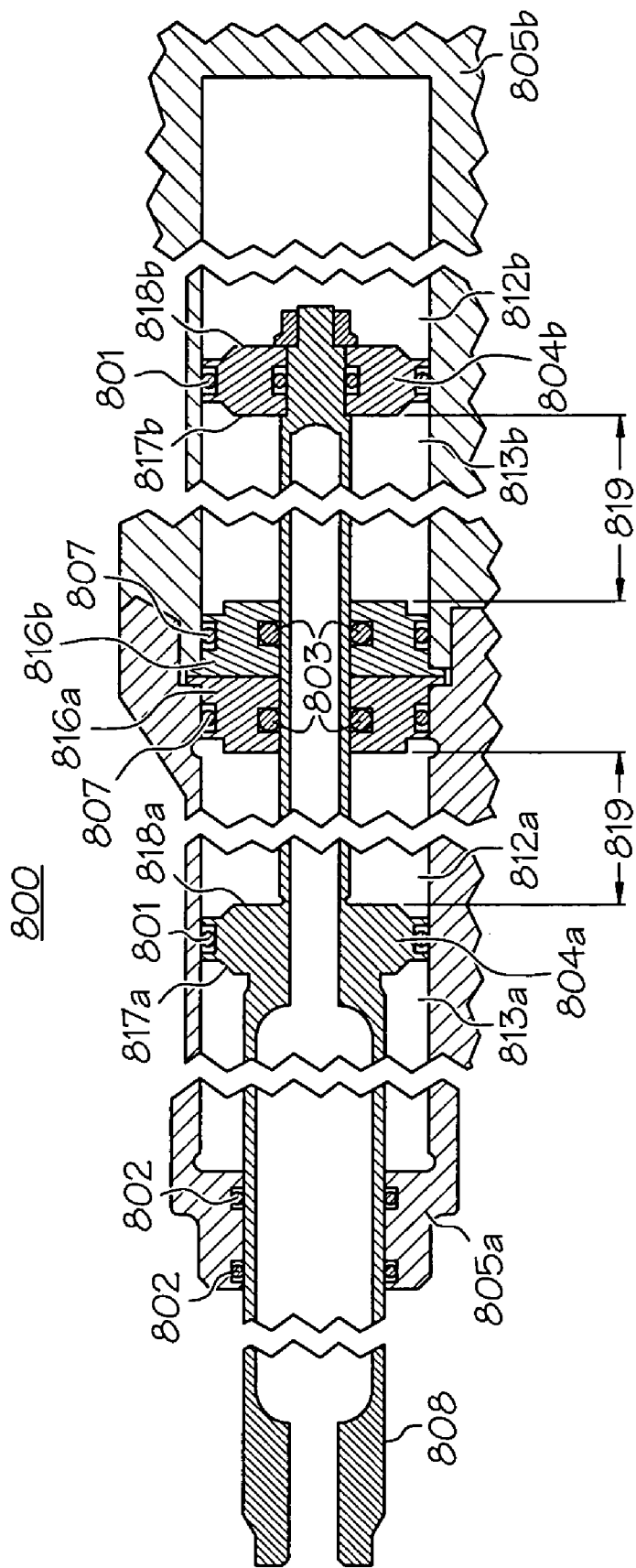
FIG. 8 shows a broken cross-section view of a representative dual-tandem output piston assembly.

FIG. 8 shows a broken cross-section view of a representative dual-tandem output piston assembly or actuator 800. Output shaft 808 having a stroke length 819 is shown connected to a main piston that includes a first piston head 804a and a second piston head 804b. The first piston head 804a slides within a first cylinder assembly 805a, which may be integral with or attached to a system manifold containing the hydraulic flow control system for piston head 804a. Similarly, the second piston 805b head slides within a corresponding second cylinder assembly 805b. The second cylinder assembly 805b may be integral with or connected to a different system manifold. While no control lines or hydraulic ports are shown in the drawing, it will be understood that such will be present at suitable locations.

The first and second cylinder assemblies 805a, 805b may be connected by appropriate connections, for example they may be rigidly connected and bolted together, etc. First and second center glands 816a, 816b may separate two interior chambers of the connected cylinder assemblies 805a, 805b to provide both a piston stop surface and hydraulic sealing. Each center gland, e.g., 816a, may include a single piston rod dynamic seal 803 and single static seal 807. Each center gland, e.g., 816b, may be installed and trapped between both system cylinders. In certain embodiments, the center glands 816a, 816b may be made from self-lubricating aluminum bronze material, which may reduce piston rod-to-center gland contact wear. Both cylinders 805a, 805b may be positioned for attachment using a close-tolerance pilot diameter located concentric with the center gland and at the flow control valve assembly outer diameter. Piston rod dynamic seals 802 and piston head dynamic seals 801 may be present to improve hydraulic sealing.

With continued reference to FIG. 8, the areas on the extend 818a, 818b and retract 817a, 817b sides of the pistons, acted on by extend 812a, 812b and retract control chambers 813a, 813b, respectively, may be different and designed as required. For example, the extend and retract piston areas may be designed to meet both specification stall load and envelope requirements. In certain embodiments, the first piston area may be designed as slightly unequal and/or fully unequal. For example, the first piston may have a extend area of 1.554 in$^2$ (1002.8 mm$^2$) and a retract area of 1.063 in$^2$ (685.9 mm$^2$) with the corresponding second piston having an extend area of 1.604 in$^2$ (1034.7 mm$^2$) and a retract area of 1.410 in$^2$ (909.9 mm$^2$). In certain embodiments, the piston areas may be equal or substantially equal to minimize bias forces tending to move the corresponding piston within the corresponding cylinder chamber.

Figure 9:
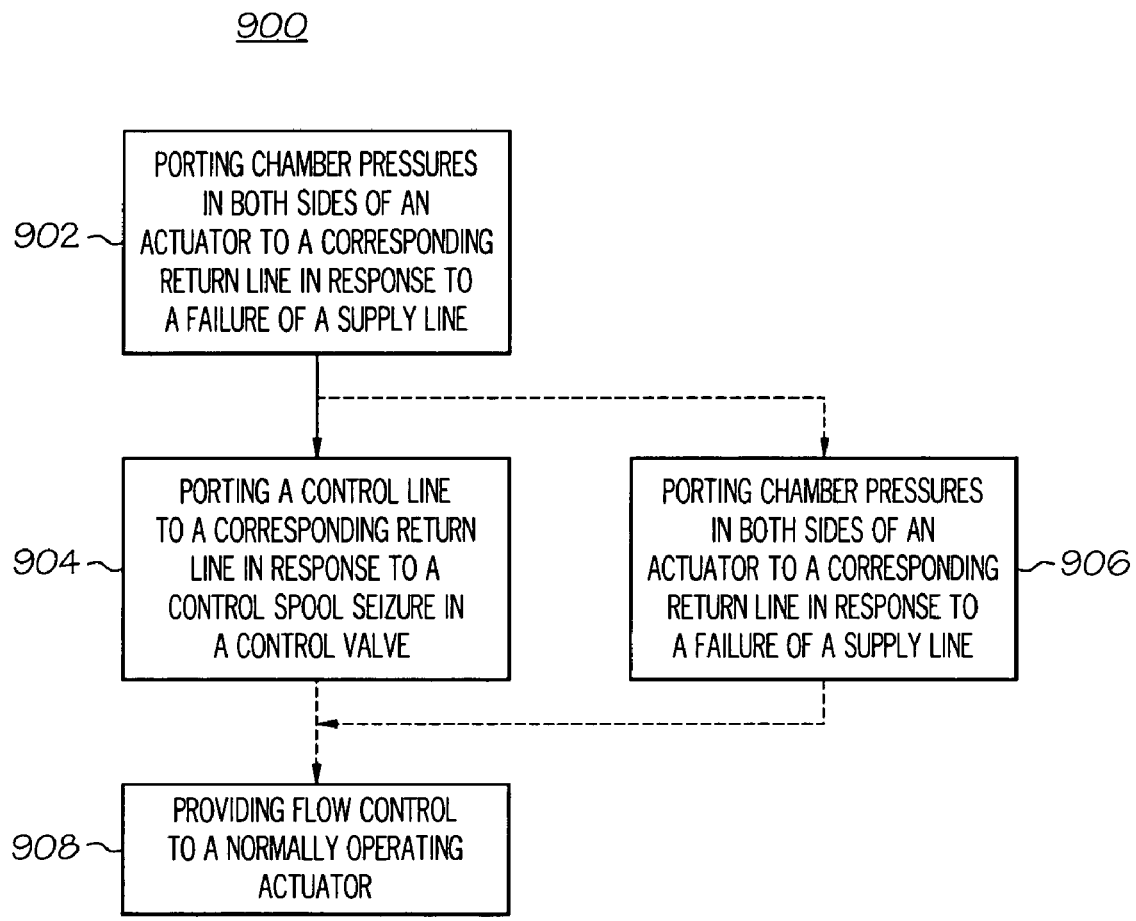
FIG. 9 shows a flow chart for a method of providing redundant flow control for a redundant hydraulic actuator.

FIG. 9 shows a flow chart for a method 900 of providing redundant flow control for a redundant hydraulic actuator or servoactuator system. Cylinder chamber pressures in both sides of a hydraulic actuator of a redundant actuator may be ported 902 to a corresponding return line in response to failure of a corresponding hydraulic flow control system. A pressure control line may be ported 904 to a corresponding return line in response to a control spool seizure in a jammed control valve. Chamber pressures in both sides of the actuator may be ported 906 to a corresponding return line in response to a failure in a corresponding supply line. Flow control to a piston of the redundant actuator may be provided 908 using a non-failed hydraulic flow control system. Porting of the actuator cylinder chambers in the failed hydraulic flow control system may reduce or eliminate the load from that system on the redundant actuator. It will be understood that steps 904 and 906 may occur individually or together in any order.

Operation of a main servo control system will now be described with reference to the drawings. Under normal operating conditions, for example as shown in FIG. 1, each flow control system is supplied with hydraulic fluid from a supply line at a system pressure. Hydraulic fluid pressure at a control end of the bypass-shutoff valve counters the force supplied to the bypass spool by the bias means, and the bypass spool is consequently positioned so that a port or groove in the bypass spool allows the supply line to flow to the flow control valve, which may function as a four-way flow control valve, e.g., a closed-center four-way flow control valve.

In normal operation, each flow control valve may act in tandem with the other to extend or retract the respective servoactuator pistons. Each of the dual flow control valves control hydraulic pressure and flow into and out of linear extend and retract cylinder cavities so that the servoactuator can move a load, e.g., a main rotor swashplate, at a controlled rate in response to a mechanical pilot input command.

When one flow control system suffers a hydraulic failure and loses pressure in its supply line, the control pressure at the control end of the bypass shutoff valve drops. The force supplied by the bias means then causes the bypass spool to move to the bypass position. In the bypass position, ports in the bypass spool connect the actuator control chamber lines, i.e., the extend and retract lines, to the return line, thus relieving, or "dumping," the pressure in the chambers of the actuator of that particular flow control system. The remaining flow control system(s) and actuator(s) can be controlled normally, without having to counter system pressure forces acting on the piston of the failed system. Small bias forces may be present in the failed actuator when the areas of the different sides of the piston are not equal, however, such bias forces will be small since the return line pressure is low compared to the supply or system pressure.

In the case that one of the primary control spools of the flow control valves becomes jammed or seized within its corresponding bypass control spool, the respective bypass control spool and primary control spool will move as a unit within the sleeve of that flow control valve when sufficient force is provided to overcome the force provided by the centering means. When the bypass spool moves relative to the sleeve, the metering surfaces, or control edges, on the bypass control spool move relative to the orifices in the sleeve. The orifices in the sleeve are connected to the return line and the control line to the. Once the bypass control spool moves from a neutral position in either direction relative to the sleeve, the fluid under pressure in the control line and control side of the bypass valve is ported to the return line. When the control side pressure drops in the bypass valve, the bypass spool moves to the bypass position. The actuator extend and retract lines are consequently ported through the bypass spool to the return line. Pressure in the chambers of the cylinder is consequently reduced to the return line pressure, with little force acting on the piston.

After a primary to bypass control spool seizure, displacement of the bypass control spool (i) ports bypass-shutoff valve control chamber fluid to the return, which allows the bypass-shut-off valve to reposition to the bypass position and interconnect the cylinder chambers to the return line, and (ii) allows normal mechanical input control of the non-seized flow control valve assembly.

When there is either a hydraulic supply failure in one system flow control system, as shown in FIG. 2, or a primary control spool jam in one flow control valve, as shown in FIG. 3, the cylinder chambers may be pressure-balanced to the return line and interconnected by some means to allow the pilot to continue to mechanically operate the servoactuator using the non-failed system.

The present invention thus provides redundant flow control for hydraulic actuators and servoactuators and provides fail-operate capability following either a single hydraulic supply failure or single flow control valve jam failure or simultaneous hydraulic supply failure and flow control valve jam in a single system. Minimal degradation of performance will be encountered when operating the non-failed system using this invention.

Accordingly, embodiments of the present inventions may be used in aerospace systems including flight control systems, e.g., a fixed-wing or helicopter flight control systems, to control and position equipment including but not limited to swashplates, landing gear, main landing gear, speed brake control surfaces, and flap control surfaces, and primary flight control surfaces.

In certain embodiments, the material for the main piston and piston head may be 15-5PH corrosion resistant steel (CRES). This type of steel may be heat treated to a H1025 condition corresponding to a yield strength of about 155 to 175 ksi (1069 to 1206 N/m$^2$). The piston rod diameters may be chrome plated or may have a suitable alternative coating to maximize piston rod dynamic seal/scraper service life. In certain embodiments, piston heads may be unplated/bare 15-5PH CRES. A lock nut used with the piston assembly may be of the same material as the piston(s). A lock nut washer may be used that is made of 300 series CRES.

In certain embodiments, actuator cylinders may be made from 7075-T73 aluminum alloy, hard-anodized coated throughout, including cylinder bore, to a depth of approximately 0.0015 to 0.0020 inch (0.0381 to 0.0508 mm) for wear resistance and corrosion protection. A hard-anodized piston cylinder bore may ensure that piston head dynamic seal wear will be minimized. A hard-anodized piston rod bore may ensure that bore wear, caused by any piston rod cycling, will be minimized.

In certain embodiments, suitable dynamic seal for use with a piston assembly may include a Busak-Shamban brand STEPSEAL type seal and an o-ring. Other suitable materials may also be used as multi-element seals and o-rings. A piston rod scraper may also be present. In certain embodiments, a Busak-Shamban brand EXCLUDER rod scraper may be used.

Furthermore, in certain embodiments dynamic seals may be used on the primary control spool and bypass spool to facilitate the prevention of leakage between the dual-hydraulic systems. In certain embodiments, the restrictor-check valve assembly may be a cartridge for ease of packaging and installation, and may combine the functions of a fixed orifice and a check valve. The check valve portion may be configured as a ball/seat design and the small sized fixed orifice may be filtered in each flow direction to prevent blockage due to contamination. The restrictor-check valve assembly may be made from 300 series corrosion resistant steel (CRES). In certain embodiments, a Lee Company restrictor-check valve assembly, P/N FCFA 2815 series, or equivalent may be used. An inlet retained to the manifold/cylinder assembly with a standard AN814 aluminum alloy bleeder plug may be used in conjunction with the filter.

In certain embodiments, the inner and outer springs of the centering means may be made from 17-7 PH corrosion resistant steel (CRES) material that is heat treated to an H900 condition. In certain embodiments, retainers used with the springs may be made from 300 series CRES material and the retainer pin may be made from 400 series CRES material.

In certain embodiments, a Honeywell Division Micro Switch environment-proof basic switch, e.g., part number 1XE3, a single-pole single-throw (SPST) normally open microswitch may be used. In certain embodiments, electrical connector such as wall mounting electrical receptacle M83723/83W1005W that comply with MIL-C-83723, Series III connectors may be used. In certain embodiments, the primary control spool, the bypass control spool and the sleeve may be made from 440C corrosion resistant steel (CRES) and may be heat-treated to a hardness of greater than or equal to 58 on the Rockwell C hardness scale (RHC58). In certain embodiments, the sleeve adjuster/lock(s) for the flow control valves may be made from 15-5PH CRES and may be heat-treated to an H1025 condition.

Although the present invention has been described in considerable detail with reference to certain preferred version thereof, other versions are possible. It should also be understood that any dimensions used herein are only for illustrative purposes. While the previous description referenced moving-body type servoactuators control systems, embodiments of the present invention may be used for fixed-body type servoactuator control systems. Furthermore, while the embodiments described previously were directed to a helicopter swashplate control system, one of skill in the art will understand that the present invention may be used for application where redundant actuators are required to have fail-operate capability. While the previous description referenced mechanical pilot input controlled dual-piston actuators and/or servoactuators, the scope of the present invention includes use with actuators having multiple-pistons. It will be understood that servoactuators as referred to herein may include all electric operation in a fly-by-wire configuration with position feedback functionality, e.g., electronic position error signals and electrically controlled flow control valves. Additionally, while the previous description referenced flow control valves acting as four-way control valves, it should be understood that the scope of the present invention includes other types of flow control valves, e.g., three-way flow control valves.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise.

What is claimed is:

1. A hydraulic flow control system for use with a tandem hydraulic actuator, said system comprising:
   a flow control valve assembly including a sleeve, a bypass control spool slidingly disposed within said sleeve, and a primary control spool slidingly disposed within said bypass control spool;
   a bypass-shutoff valve hydraulically coupled to a supply line, a return line, a pressure control line, an actuator extend line and an actuator retract line; and
   a restrictor-check valve assembly, wherein said restrictor-check valve assembly is hydraulically coupled to said bypass-shutoff valve and said supply line.

2. The system of claim 1, wherein said primary control spool comprises one or more lands.

3. The system of claim 1, said bypass control spool comprising one or more circumferential grooves on an outer radial surface.

4. The system of claim 3, wherein said one or more grooves include a bypass groove having first and second control edges.

5. The system of claim 4, wherein said bypass control spool is movable within said sleeve from a first position in which first and second lands connected to said first and second control edges each block an orifice in said sleeve to one or more second positions in which one of said lands does not fully block one of said orifices, allowing hydraulic fluid in a bypass-shutoff valve pressure control line to enter a return line.

6. A servoactuator control system comprising:
   a first flow control valve having a first primary control spool slidingly disposed within a first bypass control spool and a first fixed sleeve in which said first bypass control spool is slidingly disposed;
   a second flow control valve having a second primary control spool slidingly disposed within a second bypass control spool and a second fixed sleeve in which said second bypass control spool is slidingly disposed;
   a first bypass-shutoff valve hydraulically coupled by a first hydraulic circuit to said first flow control valve;
   a second bypass-shutoff valve hydraulically coupled to said second flow control valve;
   a first restrictor-check valve assembly hydraulically coupled to said first bypass shut-off valve;
   a second restrictor-check valve assembly hydraulically coupled to said second bypass-shutoff valve; and
   a tandem hydraulic actuator hydraulically coupled to said first flow control valve and said second flow control valve.

7. The system of claim 6, wherein said first sleeve comprises an outer radial surface having one or more circumferential grooves aligned with flow paths of said first hydraulic circuit.

8. The system of claim 7, wherein said first sleeve comprises one or more sleeve orifices and flow passages connecting one or more of said circumferential grooves to an inner radial surface of said first sleeve.

9. The system of claim 6, wherein said first bypass control spool comprises an outer radial surface having one or more circumferential grooves.

10. The system of claim 8, wherein said first bypass control spool further comprises a bypass groove having first and second control edges.

11. The system of claim 10, wherein said first bypass control spool is movable from a first position that blocks fluid flow between a control fluid path in said first hydraulic circuit and a return fluid path in said first hydraulic circuit, to one or more second positions that connect said control fluid path to said return fluid path.

12. The system of claim 11, wherein a first and second lands connected to said first and second control edges block orifices in grooves connecting said return fluid paths to said bypass groove on said bypass control spool.

13. The system of claim 6, wherein said second sleeve comprises an outer radial surface having one or more circumferential grooves aligned with flow paths of said second hydraulic circuit.

14. The system of claim 13, wherein said second sleeve comprises one or more sleeve orifices and flow passages connecting one or more of said circumferential grooves to an inner radial surface of said second sleeve.

15. The system of claim 6, wherein said second bypass control spool comprises an outer radial surface having one or more circumferential grooves.

16. The system of claim 15, wherein said second bypass control spool further comprises a bypass groove having first and second control edges.

17. The system of claim 16, wherein said second bypass control spool is movable from a first position that blocks fluid flow between a control fluid path in said second hydraulic circuit and a return fluid path in said second hydraulic circuit, to one or more second positions that connect said control fluid path to said return fluid path.

18. The system of claim 17, wherein first and second lands connected to said first and second control edges block orifices in grooves connecting said return fluid paths to said bypass groove on said second bypass control spool.

19. The system of claim 6, wherein said first primary control spool is lapped and flow-ground to said first bypass spool.

20. The system of claim 6, wherein said first bypass control spool is lapped and flow-ground to said first sleeve.

21. The system of claim 6, wherein said second primary control spool is lapped and flow-ground to said second bypass spool.

22. The system of claim 6, wherein said second bypass control spool is lapped and flow-ground to said second sleeve.

23. The system of claim 6, wherein said first primary control spool and said first bypass control spool have a diametrical clearance of approximately 0.001 in. (0.00254 mm).

24. The system of claim 6, wherein said first bypass control spool and said first sleeve have a diametrical clearance of approximately 0.001 in. (0.00254 mm).

25. The system of claim 6, wherein said second primary control spool and said second bypass control spool have a diametrical clearance of approximately 0.001 in. (0.00254 mm).

26. The system of claim 6, wherein said second bypass control spool and said second sleeve have a diametrical clearance of approximately 0.001 in. (0.00254 mm).

27. The system of claim 6, said first and second primary control spools are linked at first and second input ends, respectively, to a common input shaft.

28. The system of claim 6, wherein a first longitudinal axis of said first flow control valve and a second longitudinal axis of said second flow control valve are collinear.

29. The system of claim 6, further comprising a first sleeve lock means for locking said first flow control valve relative to a manifold.

30. The system of claim 6, further comprising a second sleeve lock means for locking said second flow control valve relative to a manifold.

31. The system of claim 6, further comprising a first hydraulic null adjustment means.

32. The system of claim 6, further comprising a first seizing detection switch in communication with said first bypass-shutoff valve, said first seizing detection switch operable to produce a failure signal when said first bypass-shutoff valve is in a bypass position.

33. The system of claim 6, further comprising a second seizing detection switch in communication with said second bypass-shutoff valve, said second seizing detection switch operable to produce a failure signal when said second bypass-shutoff valve is in a bypass position.

34. A method of providing redundant flow control for a hydraulic actuator comprising the steps of:

in response to failure of a first hydraulic flow control system, porting pressurized fluid from first and second cylinder chambers on respective sides of a first piston through internal ports within a bypass spool to a return line of said first hydraulic control system; and providing flow control to a second piston of a second hydraulic flow control system, wherein said second piston is connected to said first piston.

35. The method of claim 34, wherein said step of porting pressurized fluid is in response to a hydraulic supply line failure.

36. The method of claim 34, wherein said step of porting pressurized fluid chamber is in response to an actuator jam.

37. The method of claim 34, wherein said step of porting pressurized fluid cylinder comprises moving a bypass-shut-off valve from a shut-off position to a bypass position.

38. The method of claim 34, wherein said step of porting pressurized fluid comprises displacing a bypass control spool from a null position.

* * * * *